(No Model.) 2 Sheets—Sheet 1.
T. J. PEARSON.
WHIFFLETREE.
No. 266,308. Patented Oct. 24, 1882.
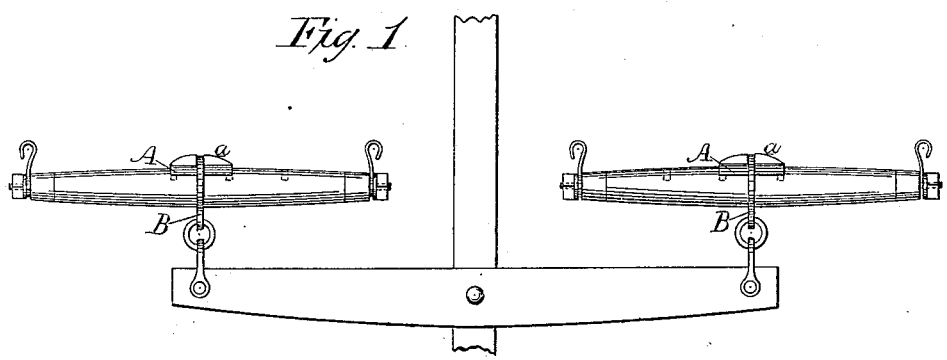
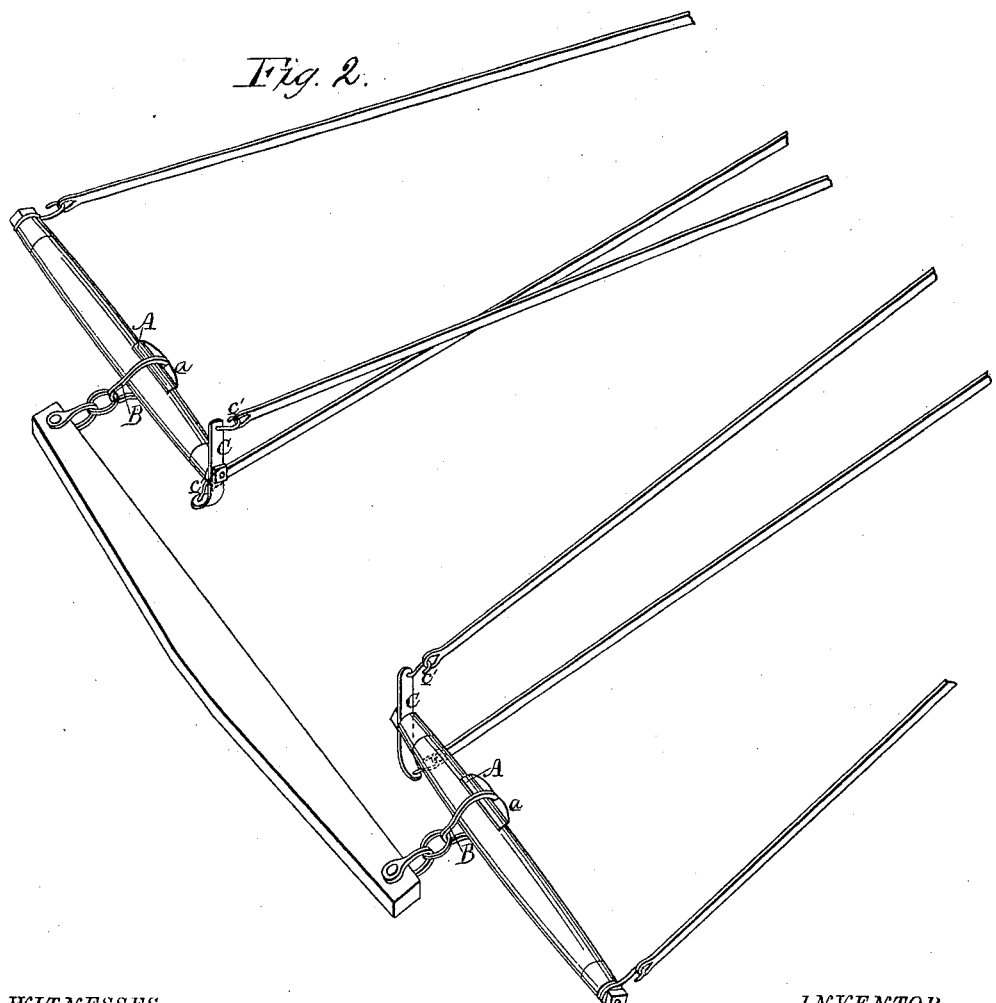
WITNESSES
INVENTOR
Thos. J. Pearson
By Soulé & Co
Attorneys (No Model.)
T. J. PEARSON.
WHIFFLETREE.
No. 266,308. Patented Oct. 24, 1882.
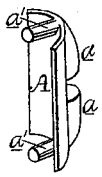
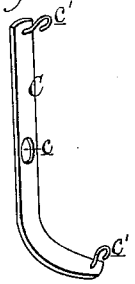
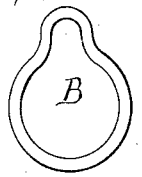
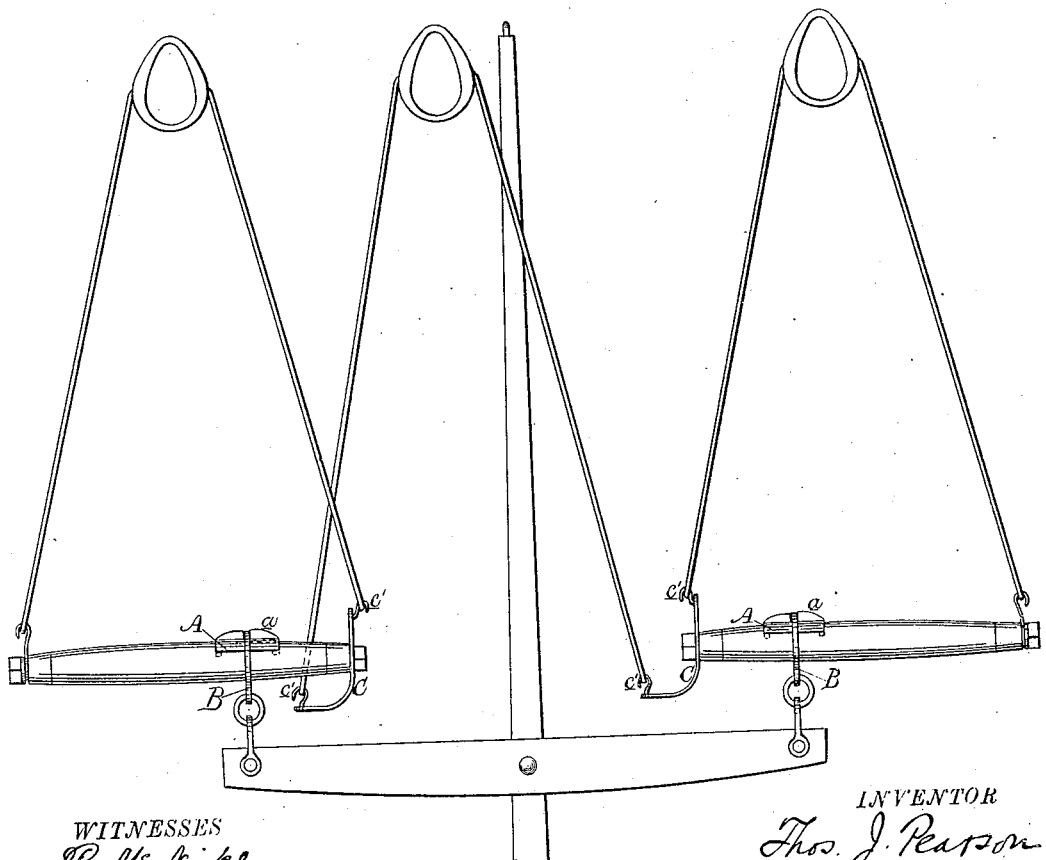
WITNESSES
P. McNickle.
Jos. C. Ryan
INVENTOR
Thos. J. Pearson
By Soulé & Co
Attorneys.

UNITED STATES PATENT OFFICE.

THOMAS J. PEARSON, OF CAYUGA, ILLINOIS.

WHIFFLETREE.

SPECIFICATION forming part of Letters Patent No. 266,308, dated October 24, 1882.

Application filed October 18, 1881. Renewed July 1, 1882. (No model.)

*To all whom it may concern:*

Be it known that I, THOMAS J. PEARSON, a citizen of the United States, residing at Cayuga, in the county of Livingston and State of Illinois, have invented certain new and useful Improvements in Whiffletrees; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to double-trees; and its object is to enable such a tree to be adjusted for either two or three draft-animals, as desired, in either a tongued or tongueless vehicle or implement.

In the accompanying drawings, Figure 1 is a plan view of my trees adjusted for two horses; Fig. 2, a perspective view of the same adjusted for three horses in a tongueless vehicle; Fig. 3, a plan view of the same adjusted for three horses in a tongued vehicle; Fig. 4, a rear perspective view of my socket-plate for adjustable trees; Fig. 5, a side perspective view of my short equalizer used with three horses, and Fig. 6 a plan view of my coupling-ring used as a part of the adjusting apparatus.

Like letters refer to like parts in the several drawings.

A is a metallic plate, convex on the outer surface and concave on the inner surface, with a lug, $a$, formed upon the outer surface, resected at the center and sloping to the ends; also, two short socket-pins, $a'\ a'$, projecting at right angles from the middle of the inner surface of the plate, near each end thereof.

B is a metal pear-shaped ring, which, in combination with A, holds the two whiffletrees in proper adjustment to the double-tree, as can be plainly seen in Fig. 3; but this ring may be oval, elliptical, or any other shape that will enable it to receive, retain, and release the single-tree, and which will slip over and into the socket of the tree-plate A.

C is a short flat metallic draft-equalizer, much curved at one end, with center eye, $c$, and trace-hooks $c'\ c'$; but the curving may be omitted at pleasure.

To use my whiffletrees for two horses, attach the plates A A to the center of the trees by inserting the pins in the sockets shown by dotted lines in Fig. 1. Then pass the tree through the pear-shaped ring B, with the lug $a$ toward the pointed end of the ring, and when the lug has half passed through the ring turn the plate A to the front and the tree will then be adjusted. For three horses in a vehicle, plow, or harrow without a tongue, attach the equalizers C C to the inner ends of the whiffletrees in the manner shown in Fig. 2, holding them loosely on the short round projecting stems of the trees by means of screw-nuts, and then hook the inner traces of the outside horses and both traces of the inside horse to the equalizers, as shown in Fig. 2, just named; but before hooking the traces shift the plates A A from the center toward the inner ends of the trees, as suggested in Fig. 1 and shown in Fig. 2. For three horses in a tongued vehicle, adjust the equalizers so that the curves shall both be in the same direction, and place the horses and arrange the traces as shown in Fig. 3.

I am aware that a pear-shaped ring similar to that in Fig. 6, herewith, appears in the Letters Patent issued to W. W. Winter, June 8, 1880, No. 228,502. Hence I do not claim such ring absolutely or broadly.

I am also aware that an equalizer or lever somewhat resembling my own (shown in Fig. 5 herewith) appears in the Letters Patent issued to L. W. Frederick, April 16, 1878, No. 202,432. Hence I do not claim the principle of such equalizers, but only the form and arrangement of my own.

Having thus described my invention, what I claim as new, and desire to secure by Letters Patent, is as follows:

1. In whiffletrees, the adjustable plate A, with lug $a$, and socket-pins $a'\ a'$, substantially as described.

2. In whiffletrees, the draft-equalizer C, either curved or straight, with eye $c$, and trace-hooks $c'\ c'$, perpendicularly adjusted for use as a triple-tree, substantially as described.

3. In whiffletrees used as triple-trees, the combination of the plate A, lug $a$, pins $a'\ a'$, ring B, and equalizers C C, substantially as and for the purposes described.

In testimony whereof I affix my signature in presence of two witnesses.

THOMAS J. PEARSON.

Witnesses:
 JOHN W. SADLEY,
 W. GORE.